United States Patent Office 3,359,233
Patented Dec. 19, 1967

3,359,233
POLY-γ-OLEFIN COMPOSITIONS CONTAINING N,N,N',N' - TETRALKYLPHOSPHORODIAMIDO-THIOIC ACID AND ESTERS THEREOF
Stanley B. Mirviss, Westfield, and Adam F. Kopacki, Westwood, N.J., assignors to Stauffer Chemical Company, New York, N.Y., a corporation of Delaware
No Drawing. Filed June 18, 1964, Ser. No. 376,274
7 Claims. (Cl. 260—45.9)

This invention relates to the stabilization of polymeric materials against deterioration resulting from exposure to ultraviolet light and similar actinic radiation. The invention is particularly concerned with the stabilization of such materials by the inclusion therein of certain organophosphorus acids and esters thereof.

It is well known that plastics and polymeric materials generally are susceptible to a characteristic type of degradation when exposed to sunlight or other sources of ultraviolet rays. Although the effect varies with different materials, it commonly manifests itself initially as a weakening of the tensile strength of the polymer which on continued exposure becomes increasingly brittle until a point is reached at which mechanical failure occurs. In some instances the polymer may be transformed into a powdery mass often accompanied by intense darkening.

There have been numerous proposals for producing plastics having increased durability in the presence of ultraviolet radiation. The most familiar of these proposals consists in blending the plastic or polymer with a material which in itself is a strong ultraviolet absorber. It is this latter property which apparently affords protection of the plastic from the damaging actinic radiation. In fact, it is customary to refer to the aforesaid additives as ultraviolet stabilizers. Because of their inherently poor resistance to ultraviolet light, the successful commercialization of synthetic polymers is tied in closely with the development of a suitable stabilizer.

Whereas the principal function of an ultraviolet stabilizer is that it provide protection of the polymer, certain ancillary features and characteristics are also necessary. It is, for instance, highly important that the stabilizer should not modify or cause adverse changes in the polymer. A particularly vexatious characteristic of many plastic additives is their tendency to impart color or stain to the polymer in which they are incorporated, ultraviolet stabilizers being especially prone to this type of behavior. Such side effects cannot be tolerated where a clear or colorless polymer is needed. Even pigmented or dyed plastic materials are deleteriously affected by stabilizer staining since it causes over-all color degradation. Other undesirable side effects often encountered are odor production, softening, bleeding and the like. A desideratum from the commercial standpoint is that the stabilizer be readily available or economical to manufacture.

We have now discovered that excellent ultraviolet stabilization of polymers can be achieved without encountering the aforesaid undesirable side effects by incorporating in the polymer a lower N,N,N',N'-tetralkylphosphorodiamidothioic acid or the esters thereof having the following formula:

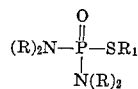

wherein R is a lower alkyl of from 1 to 8 carbon atoms, e.g. methyl, ethyl, isopropyl, isobutyl, n-butyl, n-pentyl, isopentyl, n-hexyl, isohexyl, n-heptyl and octyl; aryl, e.g. phenyl, naphthyl, biphenyl, etc.; $R_1$ is hydrocarbyl such as an alkyl of from 2 to 24 carbon atoms, e.g. methyl, ethyl, n-propyl, isobutyl, n-pentyl, isopentyl, n-hexyl, isohexyl, n-heptyl, n-octyl, isooctyl, n-nonyl, n-decyl, isodecyl, undecyl, dodecyl, tridecyl, tetradecyl, pentadecyl, hexadecyl, heptadecyl, octadecyl, nondecyl, eicosyl, heneicosyl, docosyl, tricosyl, tetracosyl, etc., phenyl, naphthyl, biphenyl, aralkyl, e.g. benzyl, phenethyl, gamma-phenylpropyl, etc., substituted phenyl wherein the substituents are lower alkyl, lower alkoxyl, chlorine, fluorine and bromine.

Exemplary compounds falling within the ambit of the above depicted formula include the following:

N,N,N',N'-tetramethylphosphorodiamidothioic acid
methyl N,N,N',N'-tetramethylphosphorodiamidothioate
ethyl N,N,N',N'-tetraethylphosphorodiamidothioate
isopropyl N,N,N',N'-tetraisobutylphosphorodiamidothioate
isobutyl N,N,N',N'-tetraethylphosphorodiamidothioate
n-octyl N,N,N',N'-tetramethylphosphorodiamidothioate
N,N-diethyl-N',N'-diethylphosphorodiamidothioic acid
benzyl N,N,N',N'-tetraethylphosphorodiamidothioate
phenyl N,N,N',N'-tetraisopropylphosphorodiamidothioate
p-chlorophenyl N,N,N',N'-tetramethylphosphorodiamidothioate
p-ethoxyphenyl N,N,N',N'-tetramethylphosphorodiamidothioate
isooctyl N,N,N',N'-tetramethylphosphorodiamidothioate
cyclohexyl N,N,N',N'-tetramethylphosphorodiamidothioate
β-naphthyl N,N,N',N'-tetraethylphosphorodiamidothioate
n-heptyl N,N,N',N'-tetramethylphosphorodiamidothioate
isopropyl N,N,N',N'-tetramethylphosphorodiamidothioate.

N,N,N',N' - tetralkylphosphorodiamidothioic acids including the esters thereof are known chemical entities, the description and preparation of which can be found in the technical and chemical literature. In this connection, reference is made to such well known publications as Chemical Abstracts, the indices of which contain numerous entries on the aforesaid organophosphorus acid and its esters.

In practicing the invention, the lower N,N,N',N'-tetralkylphosphorodiamidothioic acid or its ester derivative can be blended or incorporated into the polymer by any of the conventional methods commonly used for mixing such materials with resins and plastics. A typical procedure comprises milling on heated rolls, although deposition from solvents and dry blending are other well known techniques.

In testing the stabilizers of the invention, we have found them singularly effective in protecting poly-α-olefins, diolefins, copolymers of olefins or olefins and diolefins and other hydrocarbon polymers, polymers of substituted vinyl compounds and polyesters against deterioration due to exposure from actinic radiation. The polymer compositions stabilized in accordance with the invention exhibit an extended life expectancy and are much more useful and practical than unstabilized polymers and possess a wide diversity of uses including out-of-door installations requiring prolonged exposure to sunlight and the elements. Moreover, the use of N,N,N',N'-tetralkylphosphorodiamidothioic acid and its esters, although inordinately effective as a U.V. stabilizer, does not produce any undesirable side effects. Even after exposure periods exceeding 1000 hours, test samples of polymers showed slight loss of mechanical strength while remaining substantially free of stain or coloration.

The polymers stabilized as contemplated herein can be cast, extruded, rolled or molded into sheets, rods, tubes, piping, filaments and other shaped articles, including sheets or films ranging from 0.5 to 100 mils in thickness. The polymer compositions of our invention can be applied as coatings to paper, cloth, wire, metal foil and are suitable for the manufacture of synthetic fibers and fabrics. Although the quantity of stabilizer is not particularly critical, it is recommended that the concentration based on the weight of the polymer be maintained in the neighborhood of 0.01 to about 5.0%.

The lower N,N,N',N'-tetralkylphosphorodiamidothioic acids and esters thereof as described herein are suitable for stabilizing a wide variety of solid polymer compositions against deterioration brought on by exposure to actinic radiation. In this connection mention is made of any of the normally solid polymers derived from the polymerization of α-mono-olefinic aliphatic and aryl-substituted aliphatic hydrocarbons containing from two to ten carbon atoms. Typical poly-α-olefins include polyethylene, polypropylene, poly(3-methylbutene-1), poly-(4-methylpentene-1), poly(pentene-1), poly(3,3-dimethylbutene-1), poly(4,4-dimethylbutene-1), poly(octene-1), poly(decene-1), polystyrene and the like. Copolymers of such olefins as those prepared from ethylene and porpylene or ethylene and the butenes or the like are also protected as are polydiolefins, i.e. polybutadiene or polyisopropene and olefin-diolefin copolymers of the type as butadiene-styrene or isobutylene-isoprene copolymers. Polymeric materials prepared from olefins and/or diolefins containing some vinylic monomers such as acrylonitrile or vinyl chloride as illustrated by the so-called ABS resins, acrylonitrile, butadiene and styrene terpolymers, are considered to be within the scope of this invention as are polymers of substituted vinyl monomers such as vinyl chloride, vinylidene dichloride, vinyl acetate, acrylonitrile and the like. Polyester resins with and without added styrene, divinylbenzene and the like are also stabilized by means of the N,N,N',N'-tetralkylphosphorodiamidothioic acid and its esters.

We have ascertained that the stabilizers of the invention are particularly useful for preventing photo-degradation by ultraviolet light or sunlight of stereoregular polyolefins such as isotactic polypropylene. Isotactic polypropylene is a stereoregular polymer wherein the monomeric units are linked predominantly head to tail with the methyl groups on one side of the helical chain rather than the more common arrangement with methyl groups randomly distributed on both sides of the chain. Moreover, this isotactic or singular arrangement of substituents attached to the chain promotes an orderly alignment of the molecules. Such stereoregular polymers often exhibit a high degree of crystallinity and are much superior in physical properties to atactic polymers having a random distribution of monomeric units. Stereoblock polymers wherein long segments of the chain are in one configuration or the other and also polymers with amorphous regions are also protected. For a fuller description of such polymers, reference is made to the Scientific American, 197 No. 3, pp. 98–104 (1957); 205 No. 2, pp. 33–41 (1961). Amorphous or appreciably amorphous polymers are also stabilized.

Although the molecular weight of polymers varies over wide limits, the stabilizer compounds of the invention are not restricted to any particular molecular weight range of polymer, and in fact it has been our finding that excellent protection can be realized with polymers having a broad or narrow range. Moreover, the so-called amorphous low molecular weight poly-α-olefin waxes or oils are likewise susceptible to stabilization by means of the compounds of the invention.

Polyesters which can be protected against ultraviolet radiation by means of the N,N,N',N'-tetralkylphosphorodiamidothioic acid and its esters are well known chemical entities and are described at length in the technical literature and numerous U.S. patents. One type of polyester is derived from the addition polymerization of ethylenically unsaturated organic esters, particularly vinyl ester monomers, and in this connection mention is made of acrylic esters, vinyl esters and in general any organic ester containing a

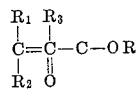

configuration wherein R, $R_1$, $R_2$ and $R_3$ represent hydrogen or an organic hydrocarbyl substituent. The polymerization is commonly effectuated by contacting the monomer with a polymerization initiator such as an organic peroxide with or without the application of heat.

Another type of polyester which can be stabilized in accordance with the invention is formed by the successive esterification of dicarboxylic acids with polyglycols. The resulting polymeric ester consists of alternate linkages of the dicarboxylic acid and polyglycol residues produced by the elimination of water from between the reactants. The resulting polymers may be linear or cross-linked depending on the selection of the components. For instance, a diglycol wherein the hydroxyl groups are terminally situated produce a linear type of polyester whereas such polyglycols as exemplified by glycerol give rise to a cross-linked polymer such as the well-known Glyptals formed by reacting glycerol with the dicarboxylic acid, phthalic acid, in the form of its anhydride.

Modifications of polyesters are the well known alkyd resins which are obtained by forming a polyester by reacting a polyglycol and an alpha-beta-ethylenically unsaturated di- or polycarboxylic acid and cross-linking the residual ethylene double bonds with a suitable cross-linking agent.

In a more specific and detailed sense, the alkyd resins as above referred to having a plurality of polymerizable alpha-beta-ethylenically unsaturated linkages may be produced by combining together a polyhydric alcohol with a polycarboxylic acid or its anhydride which contains alpha-beta-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of costs, the unsaturated polycarboxylic acids most commonly utilized are maleic, usually in the form of the anhydride, and fumaric acid. Other alpha-beta-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzonoid or aromatic unsaturation which behave as saturated acids in that their benzonoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid, a polyglycol alcohol may be selected which is ethylenically unsaturated and thereby giving residual ethylenic double bonds for the purpose of cross-linking the polyester with concomitant modification in physical and chemical properties.

In preparing an alkyl resin, the polycarboxylic acid and appropriate polyhydric alcohol are commonly reacted at elevated temperatures in the presence of an inert atmosphere. The reaction is normally carried out at a temperature from about 150° C. to about 230° C.; the inert atmosphere is conveniently provided by carbon dioxide or nitrogen gas. Generally, the total number of moles of alcohol exceeds the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cools, the appropriate unsaturated monomeric cross-linking agent added. If cross-polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2=CH-$ group. Examples of such monomers are styrene, vinyltoluene, methylacrylate, divinylbenzene, diallylphthalate, dimethylstyrene, methylmethacrylate, vinylacetate, butadiene, and the like. It is also a common practice to employ special monomers in order to secure particular effects. In this connection, mention is made of triallylcyanurate useful in imparting high heat resistance to resins, alkylallyldiglycolate for use as a refractive modifier, while diallylphenylphosphonate has been employed to impart fire resistance.

Three groups of components which we have found particularly suitable and convenient for preparing polyesters are: (1) acids such as maleic, fumaric, itaconic, phthalic and the like; (2) alcohols or glycols such as allyl alcohol, ethylene glycol and diethylene glycol; (3) unsaturated hydrocarbons such as styrene, cyclopentadiene and the like. For example, the polyesters disclosed in U.S. Patent No. 2,755,313 are illustrative of these unsaturated polyesters. Certain commercial polyesters such as the Laminacs sold by American Cyanamid Company also form satisfactory copolymers. Also polyesters such as generally described in U.S. Patent No. 2,443,736, containing an alkenyl aryl cross-linking agent, such as diallyl phthalate, and the reaction product of an alpha, beta ethylenically unsaturated polycarboxylic acid, such as maleic or fumaric acid, a saturated polycarboxylic acid free of non-benzoid unsaturation, such as phthalic acid, and at least one glycol, such as ethylene glycol and/or diethylene glycol, produced by American Cyanamid Company, may be used.

The amounts of the components useful in preparing polyesters may vary widely. In most instances, approximately two parts by weight of an unsaturated alkyd resin to one part by weight of the monomeric cross-linking agent is suitable although as above mentioned, the proportions may be varied over wide limits.

Another important polymer which can be stabilized in accordance with the invention is polyvinylchloride. This polymer is commonly produced by the emulsion polymerization using a redox initiator for polymerizing vinyl chloride. One type of polyvinylchloride is the so-called rigid or unplasticized polyvinylchloride and this particular modification of polyvinylchloride can be effectively stabilized by the compounds of the invention. As has previously been pointed out elsewhere herein, the N,N,N',N'-tetralkylphosphorodiamidothioic acid and its esters are effective as stabilizers either for the polymers themselves or various co-polymers and terpolymers and mixtures thereof. One class of polymer compositions which lends itself to stabilization by means of the compounds of the invention is resin mixtures which are blends or co-polymers of a plastic such as polystyrene or styreneacrylonitrile co-polymer with a rubber usually a butadieneacrylonitrile co-polymer. Such compositions may be intimate physical mixtures of the two components, the so-called polyblends or a true terpolymer, that is, an ABS resin, possibly produced by block or graft techniques. An example of the latter case is a graft copolymer of styrene or nitrile rubber. Typical compositions include 20–30% acrylonitrile, 20–30% butadiene and 40–60% styrene. The abbreviation ABS is taken from the initial letters of the three monomers.

For a more detailed description of the various polymers, co-polymers and terpolymers which are susceptible to stabilization in accordance with the invention, they are described at great length in the technical and chemical publications. In this connection, reference is made to such well-known treatises as "Polyester Resins" by J. R. Lawrence, Reinhold Publication Corp., New York (1960) and "Textbook of Polymer Science" by F. W. Billmeyer, published by Interscience Publishers, New York (1962).

The following examples illustrate the procedure for preparing stabilized polymer compositions of the invention although the inclusion of such examples is not to be taken as limiting or otherwise imposing any restriction on the invention, and it is to be understood that variations in practicing the same without departing from the scope or spirit thereof will be apparent to those skilled in the art to which the said invention pertains.

*Example 1*

A dry blend consisting of 0.5% by weight of N,N,N',N'-tetramethylphosphorodiamidothioic acid and 50 g. of isotactic polypropylene was subjected to compression molding in the usual manner at a temperature of 400° F. for six minutes at 2000 p.s.i. The blended polymer was compression molded or extruded into a 25 mil sheet and thereafter cut into square samples measuring 2 inches on the side. A like sample containing no stabilizer was also prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 1000 hours, the test sheet of polypropylene showed no signs of brittleness to 180° flexure test. Nor was there any evidence at this time of any surface crazing or any coloration or staining. A blank specimen of unstabilized polypropylene which was exposed concurrently with the stabilized product failed the flexure test after 250 to 300 hours exposure time.

The Weatherometer as used in compiling the data and tests described herein was purchased from the Atlas Electric Devices Company, Chicago, Ill. The instrument is identified as a 6000 watt Xenon Arc Weatherometer Model 60 W.

The polypropylene resin as used in the above described example is an unstabilized general purpose, high molecular weight polypropylene of the isotactic or crystalline type. Typically, it has a melt index of 4 at 230° C. and a specific gravity of 0.905. The resin was purchased from the Hercules Powder Company under the trade name Profax and further identified as No. 6501, type P–02004, and is supplied in the form of natural flakes. We have also used other commercially available grades of unstabilized isotactic polypropylene resin, and in this connection, mention is made of unstabilized Avisun polypropylene (Avisun Corp.) and unstabilized Shell polypropylene (Shell Chemical Co., Division of Shell Oil). The results obtained in using the various grades and types of polypropylene were in general agreement.

*Example 2*

The procedure of Example 1 was repeated but substituting polyethylene in lieu of polypropylene. In general, the results paralleled those obtained in the first example.

Example 3

The procedure of Example 1 was repeated except that the polypropylene was replaced by polyvinylchloride. In general, the degree of stabilization was comparable to that obtained in the previous examples.

Example 4

The procedure of Example 1 was repeated but in this case the polymer was a terpolymer obtained by polymerizing a mixture of acrylonitrile, butadiene and styrene. The terpolymer used in this example was of the high impact type commonly referred to in the trade as ABS polymers.

Example 5

The following example describes the procedure for using the compounds of the invention to stabilize a polyester of the alkyd type.

0.25 g. of N,N,N',N'-tetramethylphosphorodiamidothioic acid was thoroughly mixed with 5.0 g. of styrene, followed by the addition of 0.5 g. of benzoyl peroxide. The thoroughly blended components were next combined with 95 g. of Laminac 4123 purchased from the American Cyanamid Company. To effect curing of the Laminac 4123, the composition was placed between Pyrex glass plates, the edges sealed and the "sandwich" heated in an upright position at 80° C. for 30 minutes; then at 105° C. for 30 minutes and finally one hour at 120° C. The cured sample was removed from the mold, and placed in the Weatherometer for testing as described in Example 1. The degree of stabilization of the polymer was in line with the results obtained in the case of the first example.

We claim:

1. A solid polymer composition comprising a solid polymer selected from the class consisting of a poly-α-olefin, an alkyd polyester, a vinyl polymer and a terpolymer formed from acrylonitrile, butadiene and styrene and as a stabilizer therefor a stabilizing quantity of a N,N,N',N'-tetralkylphosphorodiamidothioic acid in which each of the N-alkyls contain from 1 to 8 carbon atoms and the alkyl and phenyl esters thereof, said alkyl having from 2 to 24 carbon atoms.
2. The composition according to claim 1 wherein the solid polymer is a poly-α-olefin.
3. The composition according to claim 2 wherein the poly-α-olefin is polypropylene.
4. The composition according to claim 2 wherein the poly-α-olefin is polyethylene.
5. The composition according to claim 1 wherein the vinyl polymer is a polyvinylchloride.
6. The composition according to claim 1 wherein the polymer is a terpolymer formed by the mixed polymerization of acrylonitrile, butadiene and styrene.
7. The composition according to claim 1, wherein the solid polymer is an alkyd polyester.

References Cited
UNITED STATES PATENTS

| | | | |
|---|---|---|---|
| 2,912,411 | 11/1959 | Tamblyn et al. | 260—45.9 |
| 3,013,049 | 12/1961 | Holtschmidt et al. | 260—959 |
| 3,098,840 | 7/1963 | Holtschmidt et al. | 260—45.9 |
| 3,157,568 | 1/1964 | Schoat et al. | 260—959 |
| 3,224,889 | 12/1965 | Schulde et al. | 260—45.9 |

DONALD E. CZAJA, *Primary Examiner.*

H. E. TAYLOR, Jr., *Assistant Examiner.*